US008613833B2

(12) United States Patent
Schmidt-Thuemmes et al.

(10) Patent No.: US 8,613,833 B2
(45) Date of Patent: Dec. 24, 2013

(54) AQUEOUS SUSPENSIONS OF FINE-PARTICULATE FILLERS, METHOD FOR THE MANUFACTURE THEREOF AND USE THEREOF FOR THE MANUFACTURE OF FILLER-CONTAINING PAPERS

(75) Inventors: Juergen Schmidt-Thuemmes, Neuhofen (DE); Anton Esser, Limburgerhof (DE); Joerg Nieberle, Wachenheim (DE)

(73) Assignee: BASF SE, Ludwigshafen (DE)

( * ) Notice: Subject to any disclaimer, the term of this patent is extended or adjusted under 35 U.S.C. 154(b) by 124 days.

(21) Appl. No.: 13/002,453

(22) PCT Filed: Jun. 30, 2009

(86) PCT No.: PCT/EP2009/058160
§ 371 (c)(1),
(2), (4) Date: Jan. 3, 2011

(87) PCT Pub. No.: WO2010/000726
PCT Pub. Date: Jan. 7, 2010

(65) Prior Publication Data
US 2011/0108226 A1    May 12, 2011

(30) Foreign Application Priority Data

Jul. 3, 2008    (EP) ..................................... 08159619

(51) Int. Cl.
D21H 17/35    (2006.01)
D21H 17/37    (2006.01)
D21H 17/43    (2006.01)
D21H 17/69    (2006.01)
C08L 13/02    (2006.01)
C08L 9/04    (2006.01)
C08L 9/08    (2006.01)

(52) U.S. Cl.
USPC ................. 162/168.7; 162/158; 162/164.1; 162/168.1; 162/168.2; 162/181.2; 162/181.8; 162/185; 523/200; 524/543; 524/556; 524/564; 524/571; 526/317.1; 526/318.4; 526/328; 526/329.3; 526/342; 526/347; 106/400; 106/499; 428/407

(58) Field of Classification Search
USPC .............. 162/158, 164.1, 164.6, 164.7, 162/168.1–168.2, 168.7, 185, 181.1–181.8; 524/560, 564, 565, 571; 526/314, 526/317.1, 318.3–318.4, 328, 329.3, 328.7, 526/341, 342, 346–7; 106/400, 401, 499, 106/505; 428/402, 407
See application file for complete search history.

(56) References Cited

U.S. PATENT DOCUMENTS

| | | | |
|---|---|---|---|
| 4,445,970 A | 5/1984 | Post et al. | |
| 4,506,057 A * | 3/1985 | Greene et al. | 524/461 |
| 4,609,434 A * | 9/1986 | Greene et al. | 162/168.1 |
| 6,080,802 A * | 6/2000 | Emmons et al. | 523/205 |
| 6,576,051 B2 * | 6/2003 | Bardman et al. | 106/436 |
| 7,074,845 B2 * | 7/2006 | Laleg | 524/47 |
| 7,179,531 B2 * | 2/2007 | Brown et al. | 428/407 |
| 2006/0183816 A1 | 8/2006 | Gelman et al. | |
| 2007/0240619 A1 * | 10/2007 | Munchow | 106/500 |
| 2008/0210394 A1 * | 9/2008 | Mahr et al. | 162/162 |
| 2008/0302496 A1 * | 12/2008 | Laleg et al. | 162/164.1 |
| 2010/0186915 A1 | 7/2010 | Esser et al. | |
| 2011/0230601 A1 | 9/2011 | Nieberle et al. | |

FOREIGN PATENT DOCUMENTS

| | | |
|---|---|---|
| CN | 101155961 A | 4/2008 |
| DE | 25 16 097 | 11/1975 |
| DE | 198 21 089 | 11/1999 |
| EP | 0 573 458 | 6/1995 |
| GB | 1 505 641 | 3/1978 |
| GB | 2 085 492 | 4/1982 |
| WO | 03 074786 | 9/2003 |
| WO | 03 087472 | 10/2003 |
| WO | 2006 086710 | 8/2006 |
| WO | WO 2006128814 A1 * | 12/2006 |
| WO | 2009 004080 | 1/2009 |

OTHER PUBLICATIONS

Machine translation of WO 03/074786, The European Patent Office, [online], [retrieved on Sep. 5, 2012]. Retrieved from the Internet: <URL: http://translationportal.epo.org/emtp/translate/?ACTION=description-retrieval&COUNTRY=WO&FORMAT=docdb&KIND=A2&LOCALE=en_EP&NUMBER=03074786&OPS=ops.epo.org&ENGINE=google&SRCLANG=de&TRGLANG=en>.*

International Search Report issued Oct. 2, 2009 in PCT/EP09/058160 filed Jun. 30, 2009.

Kirk Othmer, "Copper Alloys to Distillation" Encyclopedia of Chemical Technology, Third Edition, vol. 7, 1979, pp. 870-881.

U.S. Appl. No. 13/502,885, filed Apr. 19, 2012, Esser.

U.S. Appl. No. 13/147,623, filed Aug. 3, 2011, Esser, et al.

Search Report issued Aug. 27, 2012 in Chinese Patent Application No. 2009801260198 (with English Translation of Category of Cited Documents).

* cited by examiner

Primary Examiner — Yogendra Gupta
Assistant Examiner — Dennis Cordray
(74) Attorney, Agent, or Firm — Oblon, Spivak, McClelland, Maier & Neustadt, L.L.P.

(57) ABSTRACT

Aqueous slurries of finely divided fillers which are at least partly covered by anionic latices, the slurries being obtainable by treating aqueous slurries of finely divided fillers with at least one anionic latex with a glass transition temperature of $-5$ to $-50°$ C., preparation of the aqueous slurries and their use as an additive to the paper stock in the production of filler-containing paper, filler-containing cardboard or filler-containing board by draining the paper stock.

6 Claims, No Drawings

AQUEOUS SUSPENSIONS OF FINE-PARTICULATE FILLERS, METHOD FOR THE MANUFACTURE THEREOF AND USE THEREOF FOR THE MANUFACTURE OF FILLER-CONTAINING PAPERS

The invention relates to aqueous slurries of finely divided fillers which are at least partly covered by polymers, a process for their preparation and their use as an additive to the paper stock in the production of filler-containing paper, filler-containing cardboard and filler-containing board having high dry strength.

In the production of filler-containing papers, the filler slurry is added to the fiber suspension before this is passed on to the former of the paper machine. A retention aid or a retention aid system is as a rule added to the filler/fiber suspension in order to retain as much filler as possible in the paper sheet. The addition of the filler to the paper enables the papermaker to achieve numerous improvements to the sheet properties. These include properties such as the opacity, whiteness, haptic properties and printability.

If in addition the filler is cheaper than the fiber, the addition or increased addition of filler can lead to a reduction in the proportion of fiber and hence to a reduction in the production costs of the paper. Filler-containing papers or papers having a particularly high filler content can be more easily dried than papers not containing filler or than papers having a lower filler content. As a result of this, the paper machine can be operated at a higher speed and with lower steam consumption, which both increases the productivity and reduces the costs.

However, the addition of filler to the fiber suspension also has disadvantages which can be only partly compensated by the addition of further paper assistants. For a given basis weight, there are limits with regard to the amount of filler which can be used. The strength properties of the paper are usually the most important parameters which limit the amount of filler in the paper. Other factors, such as the filler retention, the drainage of the paper stock suspension and the possibly increased chemical demand during retention and sizing, may also play a role here.

The loss of strength properties of papers can in some cases be completely or partly compensated by the use of dry and wet strength agents. A customary procedure is the addition of cationic starch as a dry strength agent to the paper stock. Synthetic dry and wet strength agents, for example based on cationic and anionic polyacrylamides, are likewise used. The amount added and the strengthening effect are, however, limited in most cases. The compensating effect with regard to the loss of strength due to increase of filler and hence also the filler increase which is at all realizable are also limited to the same degree. In addition, not all strength properties are increased to the same degree and in some cases are increased only to an insufficient extent by the use of dry strength agents. An important example of this is the tear propagation strength, which is only slightly influenced by the use of starch or synthetic dry strength agents in comparison with other strength parameters. On the other hand, the increase of the filler content of the paper has as a rule a very strongly negative influence on the tear propagation strength.

Further important properties are the thickness and the stiffness of the paper. The increase in the filler content leads, at the same basis weight, to an increase in the paper density and a decrease in the thickness of the paper sheet. The latter leads to a considerable decrease in the paper stiffness. In many cases, this decrease in the paper stiffness cannot be compensated by the use of dry strength agents alone. Frequently, additional measures, such as, for example, the reduction of the mechanical pressure in the press section in the polishing stacks, in calenders or in the dry end of the paper machine, are necessary. The latter completely or partly compensates the loss of thickness by filler increase.

DE-B-25 16 097 discloses that aqueous suspensions of inorganic particles which have a positive zeta potential are mixed with an anionic latex of a resin, the equilibrium of the negative and positive charges of the particles of the inorganic substance in the suspension and of the resin in the latex being adjusted on mixing so that substantially all resin particles are bound to the surface of the particles of the inorganic substance, and the coated particles thus obtained have a zeta potential of substantially 0. However, the treatment of the inorganic particles with a latex requires that the inorganic particles be pretreated with a cationic agent, such as cationic starch, so that they have a positive zeta potential. The aqueous suspensions are added to the paper stock in the production of filler-containing paper.

EP-B-0 573 458 discloses a process for the preparation of aqueous slurries of finely divided fillers, which are at least partly covered with polymers, for the production of the filler-containing papers. In this process, first a cationic strength agent for paper and thereafter a nonionic and/or anionic strength agent for paper or a nonionic or anionic size for paper are added to an aqueous slurry of fillers. However, the cationic starting materials are always used in an amount such that the finely divided fillers carry a cationic charge.

DE-A-198 21 089 discloses another process for the preparation of aqueous slurries of finely divided fillers which are at least partly covered with polymers. In this process, an aqueous slurry of fillers is treated with at least one polymer size in the form of an aqueous dispersion in the absence of cationic strength agents for paper. However, such dispersions always comprise polymeric emulsifiers, for example degraded starches or synthetic polymers.

The unpublished European application with the application number 07111863.2 discloses a process for treating aqueous slurries of finely divided fillers, the treatment being effected by heating an aqueous slurry of at least one finely divided filler and then adding an aqueous dispersion of a latex. As a result, papers which have a high filler content and are also distinguished by high dry strength are produced. A disadvantage of this process is that the temperature increase of the aqueous slurry of finely divided fillers can scarcely be carried out in practice owing to the poor handling.

WO-A-03/074786 discloses aqueous slurries of finely divided fillers which are at least partly covered with polymers. These polymers are binders for paper coating slips, the glass transition temperature of which is in the range from −40 to +50° C. and preferably below 6° C. The binder used in the examples has a glass transition temperature of 5° C. The treatment of the aqueous slurries of finely divided fillers with binders is effected at room temperature.

It was the object of the invention to provide further aqueous slurries of finely divided fillers which, in papermaking, give papers having improved breaking length and printability compared with the known slurries. Moreover, the papers produced by the process according to the invention should have a high filler content and high dry strength.

The object is achieved, according to the invention, by aqueous slurries of finely divided fillers which are at least partly covered by anionic latices, the slurries being obtainable by treating aqueous slurries of finely divided fillers with at least one anionic latex with a glass transition temperature of −5 to −50° C.

The aqueous slurries according to the invention comprise, for example, from 1 to 70% by weight, preferably from 5 to 50% by weight, particularly preferably from 10 to 40% by weight, of at least one finely divided filler. The amount of latex is, for example, from 0.01 to 10% by weight, preferably from 0.1 to 5% by weight, particularly preferably from 0.2 to 3% by weight, based on the filler.

The invention also relates to a process for the preparation of the aqueous slurries, from 0.01 to 10% by weight of at least one anionic latex, based on filler, being added to an aqueous slurry of at least one finely divided filler or the aqueous slurry of at least one finely divided filler being introduced into an aqueous dispersion of an anionic latex and the constituents being mixed in each case.

The invention furthermore relates to the use of the aqueous slurries described above as an additive to the paper stock in the production of filler-containing paper, filler-containing cardboard or filler-containing board having a high dry strength by drainage of the paper stock.

In the context of the present invention, the term latex is understood as meaning water-insoluble homopolymers and copolymers which are preferably used in the form of dispersions or emulsions.

According to the invention, anionic latices whose glass transition temperature (measured by means of DSC) is in the range from −5 to −50° C. are used. Anionic latices having a glass transition temperature of from −10 to −40° C. and particularly preferably from −10 to −30° C. are preferably used in the aqueous slurries of finely divided fillers according to the invention.

The glass transition temperature $T_g$ is generally known to the person skilled in the art. It means the limit of the glass transition temperature toward which said glass transition temperature tends with increasing molecular weight according to G. Kanig (Kolloid-Zeitschrift & Zeitschrift für Polymere, vol. 190, page 1, equation 1). The glass transition temperature is determined by the DSC method (differential scanning calorimetry, 20 K/min, midpoint measurement, DIN 53765).

According to Fox (T. G. Fox, Bull. Am. Phys. Soc. 1956 [Ser. II] 1, page 123, and according to Ullmann's Encyclopädie der technischen Chemie, vol. 19, page 18, 4th edition, Verlag Chemie, Weinheim, 1980), the following is a good approximation for the glass transition temperature of at most weakly crosslinked copolymers:

$$1/T_g = x^1/T_g^1 + x^2/T_g^2 + \ldots x^n/T_g^n,$$

in which $x^1, x^2, \ldots x^n$ are the mass fractions of the monomers 1, 2, ... n and $T_g^1, T_g^2, \ldots T_g^n$ are the glass transition temperatures of the polymers, in each case composed only of one of the monomers 1, 2, ... n, in degrees Kelvin. The $T_g$ values for the homopolymers of most monomers are known and are mentioned, for example, in Ullmann's Encyclopedia of Industrial Chemistry, Part 5, Vol. A21, page 169, VCH Weinheim, 1992. Further sources of glass transition temperatures of homopolymers are, for example, J. Brandrup, E. H. Immergut, Polymer Handbook, 1st Ed., J. Wiley, New York, 1966, 2nd Ed., J. Wiley, New York, 1975, and 3rd Ed., J. Wiley, New York, 1989.

The latex preferably comprises at least 40% by weight, preferably at least 60% by weight, particularly preferably at least 80% by weight, of so-called main monomers (a).

The main monomers (a) are selected from $C_1$-$C_{20}$-alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds or mixtures of these monomers.

For example, alkyl (meth)acrylates having a $C_1$-$C_{10}$-alkyl radical, such as methyl methacrylate, methyl acrylate, n-butyl acrylate, isobutyl acrylate, ethyl acrylate and 2-ethylhexyl acrylate, may be mentioned.

In particular, mixtures of the alkyl (meth)acrylates are also suitable.

Vinyl esters of carboxylic acids having 1 to 20 carbon atoms are, for example, vinyl laurate, vinyl stearate, vinyl propionate, vinyl versatate and vinyl acetate.

Suitable vinylaromatics having up to 20 carbon atoms are vinyltoluene, α- and p-methylstyrene, α-butylstyrene, 4-n-butylstyrene, 4-n-decylstyrene and preferably styrene. Examples of ethylenically unsaturated nitriles are acrylonitrile and methacrylonitrile.

The vinyl halides are ethylenically unsaturated compounds substituted by chlorine, fluorine or bromine, preferably vinyl chloride and vinylidene chloride.

For example, vinyl methyl ether or vinyl isobutyl ether may be mentioned as vinyl ethers of alcohols comprising 1 to 10 carbon atoms. Vinyl ethers of alcohols comprising 1 to 4 carbon atoms are preferred.

Ethylene, propylene, butadiene, isoprene and chloroprene may be mentioned as aliphatic hydrocarbons having 2 to 8 carbon atoms and one or two olefinic double bonds.

Preferred main monomers (a) are $C_1$-$C_{20}$-alkyl (meth) acrylates and mixtures of the alkyl (meth)acrylates with vinylaromatics, in particular styrene (also summarized as polyacrylate latex) or hydrocarbons having 2 double bonds, in particular butadiene, or mixtures of such hydrocarbons with vinylaromatics, in particular styrene (also summarized as polybutadiene latex).

In addition to the main monomers (a), the latex may comprise further monomers (b), for example monomers comprising hydroxyl groups, in particular $C_1$-$C_{10}$-hydroxyalkyl (meth)acrylates, and monomers having alkoxy groups, as are obtainable by alkoxylation of monomers comprising hydroxyl groups with alkoxides, in particular ethylene oxide or propylene oxide.

Further monomers (b) are compounds which have at least two double bonds capable of free radical polymerization, preferably 2 to 6, particularly preferably 2 to 4, very particularly preferably 2 to 3 and in particular 2. Such compounds are also referred to as crosslinking agents.

The at least two double bonds of the crosslinking agents (b) which are capable of free radical polymerization can be selected from the group consisting of (meth)acryloyl, vinyl ether, vinyl ester, allyl ether and allyl ester groups. Examples of crosslinking agents (b) are 1,2-ethanediol di(meth)acrylate, 1,3-propanediol di(meth)acrylate, 1,2-propanediol di(meth)acrylate, 1,4-butanediol di(meth)acrylate, 1,6-hexanediol di(meth)acrylate, neopentylglycol di(meth)acrylate, trimethylolpropanetriol di(meth)acrylate, pentaerythrityl tetra(meth)acrylate, 1,4-butanediol divinyl ether, 1,6-hexanediol divinyl ether, 1,4-cyclohexanediol divinyl ether, divinylbenzene, ally acrylate, ally methacrylate, methallyl acrylate, methallyl methacrylate, but-3-en-2-yl (meth)acrylate, but-2-en-1-yl (meth)acrylate, 3-methyl-but-2-en-1-yl (meth)acrylate, esters of (meth)acrylic acid with geraniol, citronellol, cinnamic alcohol, glyceryl mono- or diallyl ether, trimethylolpropane mono- or diallyl ether, ethylene glycol monoallyl ether, diethylene glycol monoallyl ether, propylene glycol monoallyl ether, dipropylene glycol monoallyl ether, 1,3-propanediol monoallyl ether, 1,4-butanediol monoallyl ether and furthermore diallyl itaconate. Allyl acrylate, divinylbenzene, 1,4-butanediol diacrylate and 1,6-hexanediol diacrylate are preferred.

In addition, the anionic latex may comprise further monomers (c), for example monomers having carboxyl groups or the salts or anhydrides thereof. For example, acrylic acid, methacrylic acid, itaconic acid, maleic acid or fumaric acid and aconitic acid may be mentioned. The content of ethylenically unsaturated acids in the latex is in general less than 10% by weight. The proportion of these monomers (c) is, for example, at least 1% by weight, preferably at least 2% by weight and particularly preferably at least 3% by weight. The acid groups of the latex can, if appropriate, be at least partly neutralized before the subsequent use. Preferably, at least 30 mol %, particularly preferably from 50-100 mol %, of the acid groups are neutralized. Volatile bases, such as ammonia, or nonvolatile bases, such as alkali metal hydroxides, in particular sodium hydroxide solution, are suitable as the base.

For the composition of the anionic latices, it is critical that the glass transition temperature (measured by means of DSC) of the anionic latices is in the range from −5 to −50° C., preferably in the range from −10 to −40° C. and particularly preferably in the range from −10 to −30° C. With the aid of the literature mentioned above, a person skilled in the art knows how anionic latices having the corresponding glass transition temperature are obtained through the choice of the monomers.

Preferably used anionic latices are, for example, aqueous dispersions of
1) styrene and/or acrylonitrile or methacrylonitrile,
2) acrylates and/or methacrylates of $C_1$- to $C_{10}$-alcohols and, if appropriate,
3) acrylic acid, methacrylic acid, maleic acid and/or itaconic acid.

Dispersions of anionic latices of
(1) styrene and/or acrylonitrile,
(2) acrylates of $C_1$- to $C_4$-alcohols and, if appropriate,
(3) acrylic acid
are particularly preferred.

For example, such particularly preferred polyacrylate latices comprise 2-15% by weight of styrene, 2-15% by weight of acrylonitrile, 75-95% by weight of $C_1$-$C_4$-alkyl acrylates, preferably $C_4$-acrylates, such as n-butyl acrylate, isobutyl acrylate and/or tert-butyl acrylate, and 0-5% by weight of acrylic acid.

The preparation of the latices is effected as a rule by emulsion polymerization, and an emulsion polymer is therefore obtained. The preparation of aqueous polymer dispersions by the free radical emulsion polymerization process is known per se (cf. Houben-Weyl, Methoden der organischen Chemie, volume XIV, Makromolekulare Stoffe, loc. cit., pages 133 et seq.).

In the emulsion polymerization for the preparation of the latices, ionic and/or nonionic emulsifiers and/or protective colloids or stabilizers are used as surface-active compounds. The surface-active substance is usually used in amounts of from 0.1 to 10% by weight, in particular from 0.2 to 3% by weight, based on the monomers to be polymerized.

Customary emulsifiers are, for example, ammonium or alkali metal salts of higher fatty alcohol sulfates, such as sodium n-lauryl sulfate, fatty alcohol phosphates, ethoxylated $C_8$- to $C_{10}$-alkylphenols having a degree of ethoxylation of from 3 to 30 and ethoxylated $C_8$- to $C_{25}$-fatty alcohols having a degree of ethoxylation of from 5 to 50. Mixtures of nonionic and ionic emulsifiers are also conceivable. Ethoxylated and/or propoxylated alkylphenols and/or fatty alcohols comprising phosphate or sulfate groups are furthermore suitable. Further suitable emulsifiers are mentioned in Houben-Weyl, Methoden der organischen Chemie, volume XIV, Makromolekulare Stoffe, Georg Thieme Verlag, Stuttgart, 1961, pages 192 to 209.

Water-soluble initiators for the emulsion polymerization for the preparation of the latices are, for example, ammonium and alkali metal salts of peroxodisulfuric acid, e.g. sodium peroxodisulfate, hydrogen peroxide or organic peroxides, e.g. tert-butyl hydroperoxide. So-called reduction-oxidation (redox) initiator systems are also suitable.

The amount of the initiators is in general from 0.1 to 10% by weight, preferably from 0.5 to 5% by weight, based on the monomers to be polymerized. A plurality of different initiators may also be used in the emulsion polymerization.

In the emulsion polymerization, it is possible to use regulators, for example in amounts of from 0 to 3 parts by weight, based on 100 parts by weight of the monomers to be polymerized, by means of which the molar mass is reduced. For example, compounds having a thiol group, such as tert-butyl mercaptan, ethylacryloyl thioglycolate, mercaptoethynol, mercaptopropyltrimethoxysilane or tert-dodecyl mercaptan or regulators without thiol group, in particular, for example, terpinolene, are suitable.

The emulsion polymerization for the preparation of the latices is effected as a rule at from 30 to 130° C., preferably at from 50 to 100° C. The polymerization medium may consist either only of water or of mixtures of water and liquids miscible therewith, such as methanol. Preferably, only water is used. The emulsion polymerization can be carried out both as a batch process and in the form of a feed process, including step or gradient procedure. The feed process in which a part of the polymerization batch is initially taken, heated to the polymerization temperature and partly polymerized and then the remainder of the polymerization is fed to the polymerization zone continuously, stepwise or with superposition of a concentration gradient while maintaining the polymerization, usually over a plurality of spatially separate feeds, one or more of which comprise the monomers in the pure or emulsified form, is preferred. A polymer seed can also be initially taken in the polymerization, for example for better adjustment of the particle size.

The manner in which the initiator is added to the polymerization vessel in the course of free radical aqueous emulsion polymerization is known to the average person skilled in the art. It can be either completely initially taken in the polymerization vessel or used continuously or stepwise according to its consumption in the course of the free radical aqueous emulsion polymerization. Specifically, this depends on the chemical nature of the initiator system as well as on the polymerization temperature. Preferably, a part is initially taken and the remainder is fed in to the polymerization zone according to the consumption.

For removing the residual monomers, initiator is usually also added after the end of the actual emulsion polymerization, i.e. after a monomer conversion of at least 95%.

The individual components can be added to the reactor in the feed process from above, at the side or from below through the reactor bottom.

After the (co)polymerization, the acid groups present in the latex can also be at least partly neutralized. This can be effected, for example, with oxides, hydroxides, carbonates or bicarbonates of alkali metals or alkaline earth metals, preferably with hydroxides with which any counterions, or a plurality thereof, may be associated, e.g. $Li^+$, $Na^+$, $K^+$, $Cs^+$, $Mg^{2+}$, $Ca^{2+}$ or $Ba^{2+}$. Ammonia or amines are furthermore suitable for the neutralization. Aqueous ammonium hydroxide, sodium hydroxide or potassium hydroxide solutions are preferred.

In the emulsion polymerization, aqueous dispersions of the latex having as a rule solids contents of from 15 to 75% by weight, preferably from 40 to 75% by weight, are obtained.

The particle size of the latices is preferably in the range from 10 to 1000 nm, particularly preferably in the range from 50 to 300 nm (measured using a Malvern® Autosizer 2 C).

According to the invention, the aqueous dispersions of at least one latex are used for the treatment of finely divided fillers. Suitable fillers are all pigments which can usually be used in the paper industry and comprise inorganic material, e.g. calcium carbonate, which can be used in the form of ground calcium carbonate (GCC), chalk, marble or precipitated calcium carbonate (PCC), talc, kaolin, bentonite, satinwhite, calcium sulfate, barium sulfate or titanium dioxide, are suitable as fillers. It is also possible to use mixtures of two or more pigments, but one pigment is preferably used. The mean particle diameter is, for example, in the range from 0.5 to 30 μm, preferably between 1 and 10 μm.

The present invention also relates to a process for the preparation of the aqueous slurry of finely divided fillers.

The fillers are processed to give an aqueous slurry, for example by introduction into water. Precipitated calcium carbonate is usually suspended in water in the absence of dispersants. In order to prepare aqueous slurries of the other fillers, as a rule an anionic dispersant, e.g. polyacrylic acid having a molar mass $M_W$ of, for example, from 1000 to 40 000, is used. If an anionic dispersant is used, for example from 0.01 to 0.5% by weight, preferably from 0.2 to 0.3% by weight, thereof is used for the preparation of the aqueous filler slurries. The finely divided fillers dispersed in water in the presence of anionic dispersants are anionic. The aqueous slurries particularly preferably comprise from 10 to 40% by weight of at least one filler.

In order to prepare the aqueous slurries, according to the invention, of finely divided fillers, aqueous slurries of finely divided fillers dispersed, if appropriate, in anionic form are treated with at least one anionic latex. For example, from 0.01 to 10% by weight, based on the filler, of an anionic latex can be added to an aqueous slurry comprising from 1 to 70% by weight of at least one finely divided filler, or an aqueous slurry of a finely divided filler can be introduced into an aqueous dispersion of an anionic latex and the components mixed in each case. It is also possible for the finely divided filler to be introduced in solid form into an aqueous dispersion of an anionic latex. The treatment of the aqueous slurries of finely divided fillers with the anionic latices can be carried out continuously or batchwise. On combination of the finely divided fillers with anionic latices, the fillers are at least partly covered or impregnated with anionic latices. The mixing of the components is effected, for example, in a shear field. In general, it is sufficient if the components are stirred after combination or are treated in a shear field of an Ultraturrax apparatus. The combination and mixing of the constituents of the aqueous slurries can be effected, for example, in the temperature range from 0° C. to 95° C., preferably from 10 to 70° C. In general, the components are mixed at the respective room temperature up to a temperature of 40° C. The pH of the aqueous slurries of fillers which have been treated with anionic latices is, for example, from 5 to 11, preferably from 6 to 9, the pH of slurries comprising calcium carbonate preferably being more than 6.5.

Aqueous slurries of precipitated calcium carbonate, which is free of dispersants, and of ground calcium carbonate, which is obtainable by milling calcium carbonate or marble pieces in the presence of anionic polymeric dispersants, such as polyacrylic acids having molar masses of from 1000 to 15 000, are particularly preferably prepared.

The invention furthermore relates to the use of the aqueous slurries as an additive to the paper stock in the production of filler-containing paper, filler-containing cardboard or filler-containing board by drainage of the paper stock.

The aqueous pigment slurries treated according to the invention with an anionic latex can be used for the production of all filler-containing paper grades, e.g. newsprint, SC paper (supercalendered paper), wood-free or wood-containing writing and printing papers. For the production of such papers, for example, groundwood, thermomechanical pulp (TMP), chemothermomechanical pulp (CTMP), pressure groundwood (PGW) and sulfite and sulfate pulp are used. By the use of the aqueous slurries according to the invention, the filler content of the paper can be substantially increased with virtually unchanged strength properties. Such papers have strength properties which are comparable with those of conventional papers having a low solids content.

The aqueous slurries, according to the invention, of finely divided fillers are admixed with the fiber in papermaking in order thus to form the total paper stock. In addition to the treated fillers and fibers, the total stock may also comprise other conventional paper additives. These include, for example, sizes, such as alkylketene dimers (AKD), alkenylsuccinic anhydrides (ASA), rosin size, wet strength agents, cationic or anionic retention aids based on synthetic polymers. Suitable retention aids are, for example, anionic microparticles (colloidal silica, bentonite), anionic polyacrylamides, cationic polyacrylamides, cationic starch, cationic polyethyleneimine or cationic polyvinylamine.

In addition, any combinations thereof are conceivable, for example dual systems which consist of a cationic polymer with an anionic microparticle or an anionic polymer with a cationic microparticle. In order to achieve high filler retention, it is advisable to add such retention aids, which can be added, for example, to the high-consistency stock or to the low-consistency stock.

The invention is illustrated in more detail with reference to the following, nonlimiting examples.

EXAMPLES

The percentage data in the examples are percentages by weight, unless otherwise evident from the context.

Polymer 1

411.7 g of demineralized water, 14.5 g of a polystyrene seed (solids content 33%, mean particle size 29 nm) and 1.4 g of a 45% strength by weight solution of dodecylphenoxybenzenedisulfonic acid sodium salt (Dowfax® 2A1, Dow Chemicals) and 15.4 g of a 7% strength by weight solution of sodium peroxodisulfate were initially taken in a 4 l vessel having plane ground joints and equipped with an anchor stirrer. Via a regulated, external oil bath, the reaction vessel was heated to 93° C. with stirring. After the temperature had been reached, a previously prepared monomer emulsion consisting of 534.2 g of demineralized water, 22.4 g of a 15% strength by weight solution of sodium lauryl sulfate (Disponil® SDS 15, Cognis), 8 g of a 45% strength by weight solution of dodecylphenoxybenzenedisulfonic acid sodium salt (Dowfax® 2A1, Dow Chemicals), 12 g of a 10% strength by weight solution of sodium hydroxide, 36 g of acrylic acid, 108 g of styrene, 948 g of n-butyl acrylate and 108 g of acrylonitrile was metered in uniformly in the course of 2 hours. Parallel therewith, 49.7 g of a 7% strength by weight solution of sodium peroxodisulfate were metered in. The batch was stirred for a further 45 minutes while keeping the temperature constant. Thereafter, 93.6 g of a 10% strength by weight solution of sodium hydroxide were added and the reaction content was cooled to 60° C. Thereafter, two feeds consisting of a) 24 g of a 10% strength by weight solution of tert-butyl hydroperoxide and b) 33 g of a 13% strength by weight solution comprising the adduct of 2.67 g of sodium disulfite and 1.62 g of acetone were metered in parallel in the course of 30 minutes. The reactor content was cooled to room temperature.

A virtually coagulum-free polymer dispersion having a solids content of 50.2% by weight, a pH of 7.3 and a particle size, measured by dynamic light scattering (Malvern HPPS), of 184 nm was obtained. The polymer had a glass transition temperature, measured by DSC (Mettler DSC 820), of −11° C.

Polymer 2

Polymer 2 was prepared analogously to polymer 1, but a monomer mixture comprising 36 g of acrylic acid, 60 g of styrene, 1044 g of n-butyl acrylate and 60 g of acrylonitrile was used in the preparation of the monomer emulsion.

A virtually coagulum-free polymer dispersion having a solids content of 50.2% by weight, a pH of 7.5 and a particle size, measured by dynamic light scattering (Malvern HPPS), of 172 nm was obtained. The polymer had a glass transition temperature, measured via DSC, of −25° C.

Example 1

1.8 g of a 50% strength by weight dispersion of an anionic latex (polymer 1) were mixed with 150 g of a 20% strength by weight aqueous slurry of precipitated calcium carbonate (PCC) with gentle stirring at room temperature. During the addition and thereafter, the mixture was stirred at 1000 revolutions per minute (rpm) with the aid of a Heiltof stirrer. The pH of the mixture was then adjusted to 8.5.

Example 2

1.8 g of a 50% strength by weight dispersion of an anionic latex (polymer 2) were mixed with 150 g of a 20% strength by weight aqueous slurry of precipitated calcium carbonate (PCC) with gentle stirring at room temperature. During the addition and thereafter, the mixture was stirred at 1000 revolutions per minute (rpm) with the aid of a Heiltof stirrer. The pH of the mixture was then adjusted to 8.5.

Comparative Example (CE) 1

According to WO-A-03/074786

1.8 g of a 50% strength by weight dispersion of a binder for paper coating slips having a glass transition temperature of 5° C. (Acronal® S 504, BASF SE) were mixed with 150 g of a 20% strength by weight aqueous slurry of precipitated calcium carbonate (PCC) with gentle stirring at room temperature. During the addition and thereafter, the mixture was stirred at 1000 revolutions per minute (rpm) with the aid of a Heiltof stirrer. The pH of the mixture was then adjusted to 8.5.

Example 3

2.7 g of a 50% strength by weight dispersion of an anionic latex (polymer 1) were mixed with 150 g of a 30% strength by weight aqueous slurry of a commercially available kaolin clay with gentle stirring at room temperature. During the addition and thereafter, the mixture was stirred at 1000 revolutions per minute (rpm) with the aid of a Heiltof stirrer. The pH of the mixture was then adjusted to 8.5.

Example 4

2.7 g of a 50% strength by weight dispersion of an anionic latex (polymer 2) were mixed with 150 g of a 30% strength by weight aqueous slurry of a commercially available kaolin clay with gentle stirring at room temperature. During the addition and thereafter, the mixture was stirred at 1000 revolutions per minute (rpm) with the aid of a Heiltof stirrer. The pH of the mixture was then adjusted to 8.5.

Example 5

2.7 g of a 50% strength by weight dispersion of an anionic latex (polymer 2) were diluted with 150 ml of water. A commercially available kaolin clay in powder form was then added to the very dilute dispersion at room temperature. The solids concentration of the slurry after the addition of the kaolin clay was 30%. During the addition and thereafter, the mixture was stirred at 1000 revolutions per minute (rpm) with the aid of a Heiltof stirrer. The pH of the mixture was then adjusted to 8.5.

Comparative Example (CE) 2

According to WO-A-03/074786

2.7 g of a 50% strength by weight dispersion of a binder for paper coating slips having a glass transition temperature of 5° C. (Acronal® S 504, BASF SE) were mixed with 150 g of a 30% strength by weight aqueous slurry of a commercially available kaolin clay with gentle stirring at room temperature. During the addition and thereafter, the mixture was stirred at 1000 revolutions per minute (rpm) with the aid of a Heiltof stirrer. The pH of the mixture was then adjusted to 8.5.

Production of Filler-Containing Paper

Papers of Type A

Examples 6-11

Comparative Examples 3-8

A mixture of bleached birch sulfate and bleached pine sulfite was beaten gel-free in the ratio of 70/30 at a solids concentration of 4% in a laboratory pulper until a freeness of 30-35 was reached. An optical brightener (Blankophor® PSG, Bayer AG) and a cationic starch (HiCat® 5163 A) were then added to the beaten stock. The digestion of the cationic starch was effected as 10% strength by weight starch slurry in a jet digester at 130° C. and with a residence time of 1 minute. The metered amount of the optical brightener was 0.5% by weight of commercial product, based on the solids content of the paper stock suspension. The metered amount of the cationic starch was 0.5% by weight of starch, based on the solids content of the paper stock suspension. The pH of the stock was in the range between 7 and 8. The beaten stock was then diluted to a solids concentration of 0.35% by weight by addition of water.

In order to determine the behavior of the aqueous filler slurries described above in the production of filler-containing paper, in each case 500 ml of the paper stock suspension were initially taken and in each case the slurries treated according to the examples and a cationic polyacrylamide as a retention aid (Polymin® KE 440, BASF SE) were metered into this pulp. The metered amount of the retention aid was in all cases 0.01% by weight of polymer, based on the solids content of the paper stock suspension.

Sheets with the pretreated fillers described above were then formed (Examples 8-16 and Comparative Examples 3-5). The amount of filler used for this purpose was adapted so that the filler contents were about 20%, 30% and 40%. In the case of the pretreated fillers, the amount of slurry which has to be used in order to achieve a certain target value is always smaller than in the case of the untreated fillers.

In addition, comparative examples with untreated filler were also carried out for the pretreated filler type (Comparative Examples 6-8). For this purpose, the amount of untreated filler slurry which is required for establishing a filler content of about 20%, 30% and 40% was first determined in preliminary experiments. Sheets with the untreated fillers were then formed.

The paper sheets were produced in each case on a Rapid Köthen sheet former according to ISO 5269/2, with a sheet weight of 70 g/m², and then dried for 7 minutes at 90° C.

Papers of Type B

Examples 12-20

Comparative Examples 9-14

A mixture of TMP (thermomechanical pulp) and groundwood was beaten gel-free in the ratio of 70/30 at a solids concentration of 4% in a laboratory pulper until a freeness of 35 was reached. The pH of the stock was in the range between 7 and 8. The beaten stock was then diluted to a solids concentration of 0.35% by weight by addition of water.

In order to determine the behavior of the aqueous filler slurries described above in the production of filler-containing paper, in each case 500 ml of the paper stock suspension were initially taken and in each case the slurries treated according to the examples and a cationic polyacrylamide as a retention aid (Polymin® KE 440, BASF SE) were metered into this pulp. The metered amount of the retention aid was in all cases 0.01% by weight of polymer, based on the solids content of the paper stock suspension.

Sheets with the pretreated fillers described above were then formed (Examples 12-20 and Comparative Examples 9-11). The amount of filler used for this purpose was adapted so that the filler contents were about 20%, 30% and 40%. In the case of the pretreated fillers, the amount of slurry which has to be used in order to achieve a certain target value is always smaller than in the case of the untreated fillers.

In addition, comparative examples with untreated filler were also carried out for the pretreated filler type (Comparative Examples 12-14). For this purpose, the amount of untreated filler slurry which is required for establishing a filler content of about 20%, 30% and 40% was first determined in preliminary experiments. Sheets with the untreated fillers were then formed.

The paper sheets were produced in each case on a Rapid-Köthen sheet former according to ISO 5269/2 with a sheet weight of 80 g/m, then dried for 7 minutes at 90° C. and then calendered with a nip pressure of 200 N/cm.

Testing of the Paper Sheets of Type A

After a storage time in a conditioned chamber at a constant 23° C. and 50% relative humidity for 12 hours, the dry breaking length of the sheets was determined according to DIN 54540, the internal bonding strength according to DIN 54516 and the stiffness according to DIN 53121. The results are stated in Table 1. The slurries corresponding to the Comparative Examples or the Comparative Examples with the paper sheets produced therefrom are characterized by the addition (CE). The other examples are examples according to the invention.

Testing of the Paper Sheets of Type B

After a storage time in a conditioned chamber at a constant 23° C. and 50% relative humidity for 12 hours, the dry breaking length of the sheets was determined according to DIN 54540 and the internal bonding strength according to DIN 54516. The dry pick resistance of the papers was determined using the IGT printability tester (ISO 3783). The results are stated in Table 2. The slurries corresponding to the Comparative Examples or the Comparative Examples with the paper sheets produced therefrom are characterized by the addition (CE). The other examples are examples according to the invention.

TABLE 1

(Testing of the paper sheets of type A)

| Example or Comparative Example (CE) | Slurry according to Example or Comparative Example (CE) | Filler content [%] | Dry breaking length [m] | Internal bonding strength [N] | Stiffness [mN] |
| --- | --- | --- | --- | --- | --- |
| 6 | 1 | 20.3 | 5511 | 313 | 79.1 |
| 7 | 1 | 29.1 | 4616 | 247 | 60.3 |
| 8 | 1 | 39.7 | 4017 | 212 | 44.2 |
| 9 | 2 | 20.6 | 5612 | 333 | 76.4 |
| 10 | 2 | 29.9 | 4589 | 254 | 61.7 |
| 11 | 2 | 40.4 | 3987 | 223 | 45.9 |
| 3 (CE) | 1 (CE) | 20.8 | 4945 | 199 | 69.1 |
| 4 (CE) | 1 (CE) | 30.4 | 4217 | 154 | 52.1 |
| 5 (CE) | 1 (CE) | 39.2 | 3518 | 117 | 37.7 |
| 6 (CE) | PCC without pretreatment | 20.2 | 4318 | 168 | 67.2 |
| 7 (CE) | PCC without pretreatment | 30.9 | 3435 | 121 | 48.4 |
| 8 (CE) | PCC without pretreatment | 39.7 | 2714 | 87 | 34.1 |

TABLE 2

(Testing of the paper sheets of type B)

| Example or Comparative Example (CE) | Slurry according to Example or Comparative Example (CE) | Filler content [%] | Dry breaking length [m] | Internal bonding strength [N] | IGT |
| --- | --- | --- | --- | --- | --- |
| 12 | 3 | 20.9 | 4956 | 367 | very good |
| 13 | 3 | 29.7 | 3448 | 288 | very good |
| 14 | 3 | 40.9 | 3066 | 234 | good |
| 15 | 4 | 19.3 | 5012 | 355 | very good |
| 16 | 4 | 31.2 | 3987 | 275 | very good |
| 17 | 4 | 40.3 | 2981 | 237 | good |
| 18 | 5 | 20.0 | 5212 | 389 | very good |
| 19 | 5 | 31.1 | 3871 | 321 | very good |
| 20 | 5 | 40.4 | 3233 | 265 | very good |
| 9 (CE) | 2 (CE) | 20.2 | 4432 | 312 | very good |
| 10 (CE) | 2 (CE) | 30.3 | 3389 | 234 | good |
| 11 (CE) | 2 (CE) | 40.3 | 2534 | 198 | good |
| 12 (CE) | Kaolin clay without pretreatment | 21.1 | 3117 | 212 | good |
| 13 (CE) | Kaolin clay without pretreatment | 29.8 | 2391 | 151 | moderate |
| 14 (CE) | Kaolin clay without pretreatment | 40.3 | 1814 | 92 | poor |

The invention claimed is:
1. An aqueous slurry of finely divided fillers which are at least partly covered by anionic latices, wherein the slurry is obtained by a process comprising treating an aqueous slurry of at least one finely divided filler selected from the group consisting of kaolin and calcium carbonate with at least one anionic latex with a glass transition temperature of −5 to −30° C., wherein the anionic latex consists of 2-15% by weight of styrene, 2-15% by weight of acrylonitrile, 75-95% by weight of $C_1$-$C_4$-alkyl acrylates and 0-5% by weight of acrylic acid.

2. The aqueous slurry according to claim 1, which comprises from 1 to 70% by weight of said at least one finely divided filler and from 0.01 to 10% by weight, based on the filler, of said at least one anionic latex.

3. A process for the preparation of an aqueous slurry according to claim 1, wherein from 0.01 to 10% by weight, based on the filler, of at least one anionic latex is added to an aqueous slurry of at least one finely divided filler, or the aqueous slurry of a finely divided filler is introduced into an aqueous dispersion of an anionic latex and the components are in each case mixed, or the finely divided filler is introduced in solid form into an aqueous dispersion of an anionic latex, wherein the anionic latex consists of 2-15% by weight of styrene, 2-15% by weight of acrylonitrile, 75-95% by weight of $C_1$-$C_4$-alkyl acrylates and 0-5% by weight of acrylic acid.

4. A method of producing paper comprising adding the aqueous slurry of claim 1 to a paper stock.

5. An aqueous slurry of finely divided fillers which are at least partly covered by anionic latices, wherein slurry is obtained by a process consisting of treating an aqueous slurry of at least one finely divided filler selected from the group consisting of kaolin and calcium carbonate with at least one anionic latex with a glass transition temperature of −5 to −30° C., wherein the anionic latex consists of 2-15% by weight of styrene, 2-15% by weight of acrylonitrile, 75-95% by weight of $C_1$-$C_4$-alkyl acrylates and 0-5% by weight of acrylic acid.

6. The aqueous slurry according to claim 1, wherein said anionic latex consist of 5-9% by weight styrene, 5-9% by weight acrylonitrile, 79-87% by weight of $C_1$-$C_4$ alkyl acrylate and 0-5% by weight acrylic acid.

* * * * *